July 2, 1957  J. H. WILLIAMS ET AL  2,797,421
COMBINED TAPPING AND COUNTERSINKING TOOL
Filed June 23, 1953  3 Sheets-Sheet 1
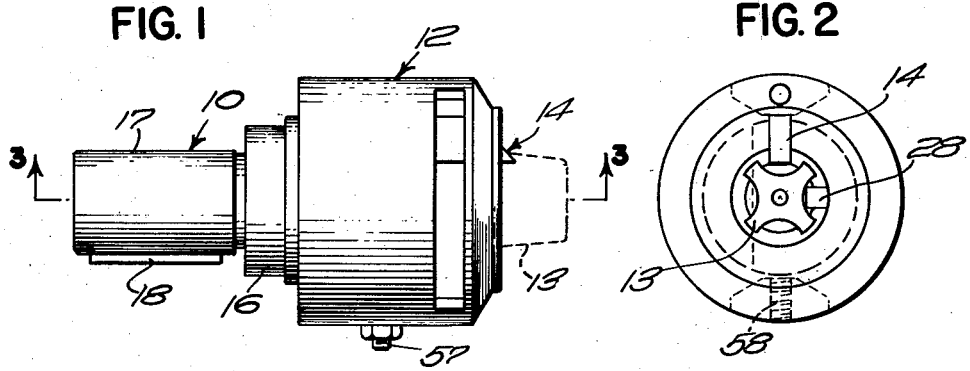
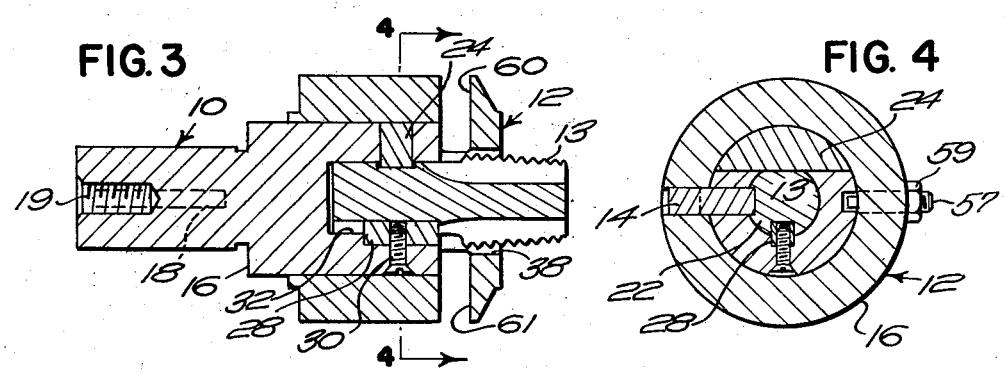
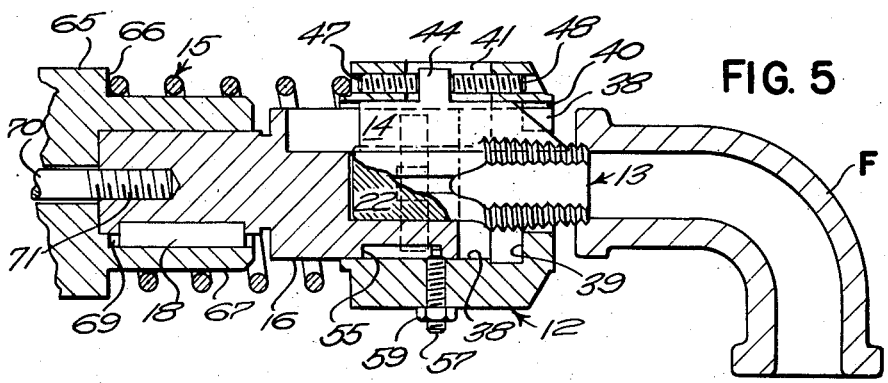
INVENTORS
JAMES HOWARD WILLIAMS
JOHN MERRIL HALL
By David D. McKenney
ATTORNEY

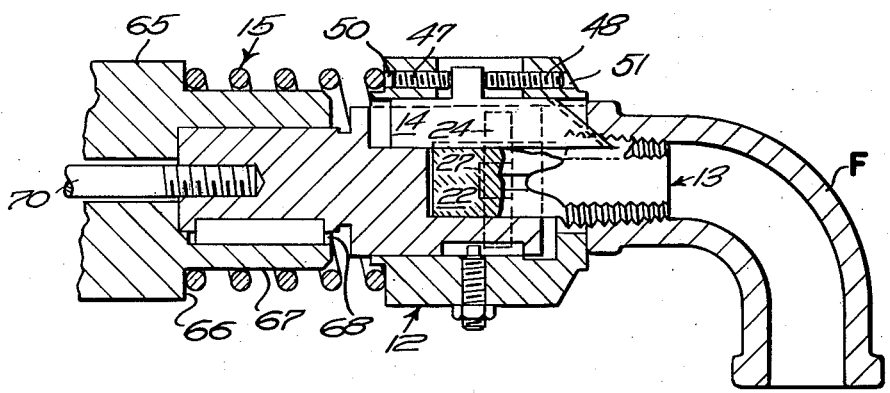
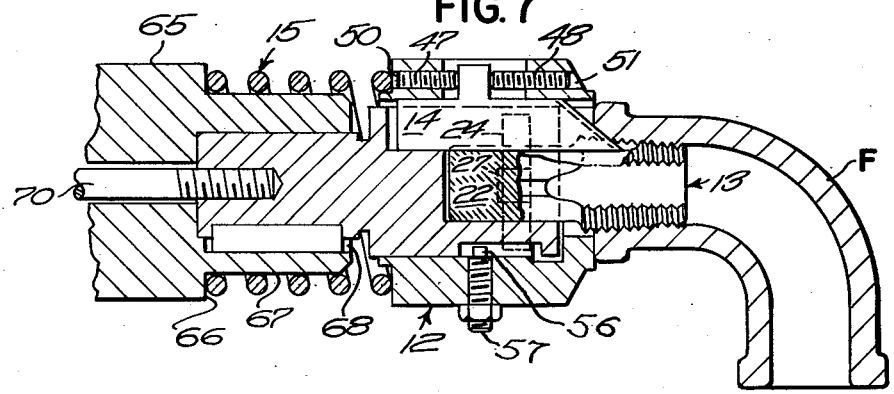
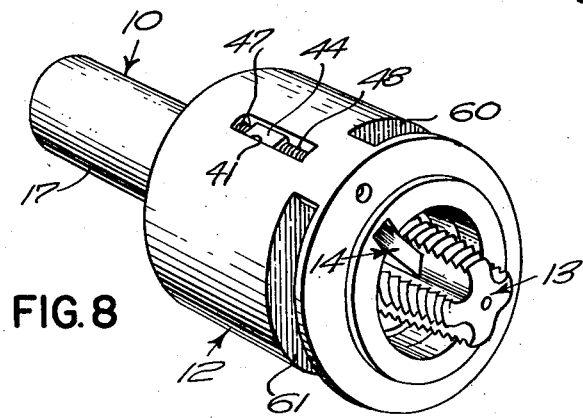

July 2, 1957   J. H. WILLIAMS ET AL   2,797,421
COMBINED TAPPING AND COUNTERSINKING TOOL
Filed June 23, 1953   3 Sheets-Sheet 3
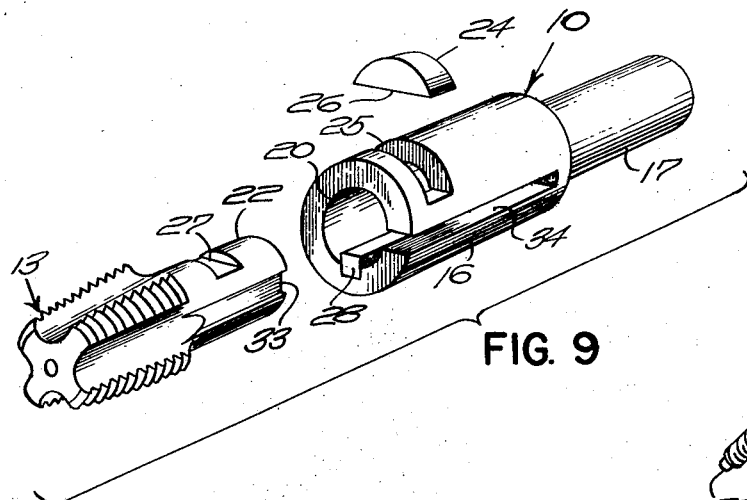
FIG. 9
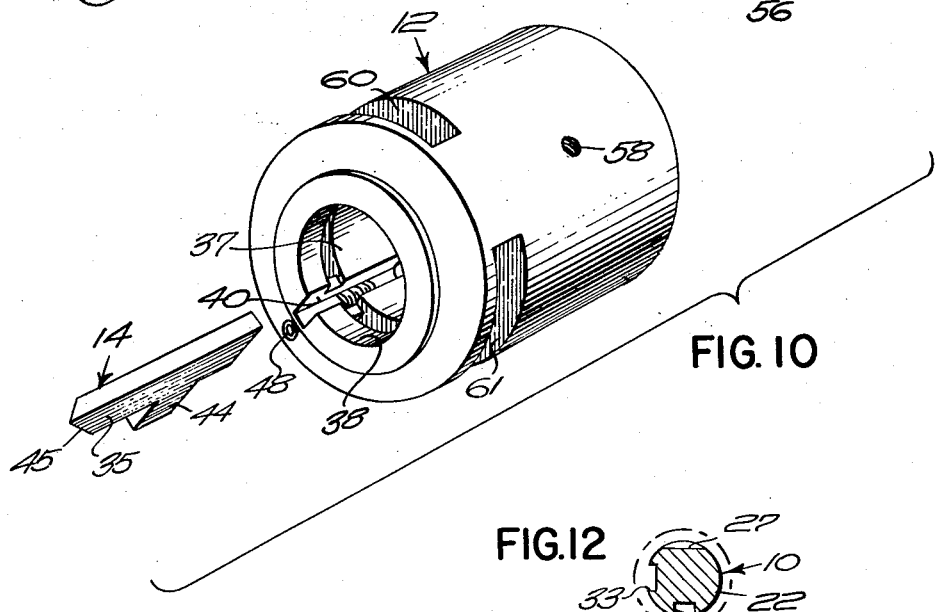
FIG. 10
FIG. 12
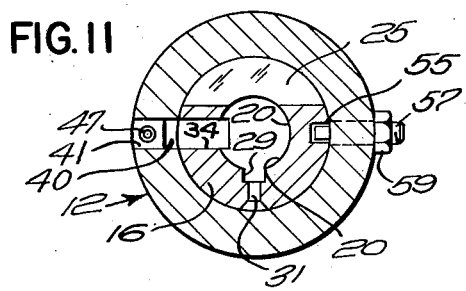
FIG. 11
INVENTORS
JAMES HOWARD WILLIAMS
JOHN MERRIL HALL
BY David D. McKenney
ATTORNEY

United States Patent Office 2,797,421
Patented July 2, 1957

2,797,421

COMBINED TAPPING AND COUNTERSINKING TOOL

James Howard Williams, Lincoln, and John Merril Hall, Warwick, R. I., assignors to Grinnell Corporation, Providence, R. I., a corporation of Delaware Application June 23, 1953, Serial No. 363,621

3 Claims. (Cl. 10—140)

This invention relates to improvements in combination tools for tapping and countersinking pipe fittings or the like. More particularly it has to do with an improved combined tapping and countersinking tool for use in power tapping machines equipped with reversible tool carrying spindles.

It is an object of the invention to provide an improved combined tapping and countersinking tool capable of tapping a plurality of threads in a pipe fitting and of countersinking the top edge of the hole taper of the fitting in one operation, and so devised that it will complete the countersink or chamfer before the last thread has been cut in the fitting to complete the tapping thereof.

Another object of the invention is to provide a combined tapping and countersinking tool which is compact in structure and wherein the parts are so arranged as to permit the complete assembly of the tool independently of the tapping machine spindle whereby the tool may be pre-assembled as a unit either for stock or for initial installation or replacement in the tapping machine thereby permitting it to be put in service easily and quickly.

A further object is to provide a combined tapping and countersinking tool construction wherein the parts are easily manufactured and so arranged as to require the minimum number of slots and keyways which must be brought into accurate registry in the assembly of the tool.

It is a further object of the invention to provide a combined tool having the above described features in which the body of the countersinking cutter will be fully supported at all times.

It is still another object of the invention to provide a combined tapping and countersinking tool construction wherein the tap can further progress into the fitting to cut the last thread therein following the completion of the countersinking operation and the countersinking cutter will be held against the front face of the fitting under sufficient pressure so as to remove all "stop marks" from the chamfer or bevel it has cut while the tap cuts the last thread in the fitting before reversing.

Further objects and advantages will be apparent from the following description of the invention taken in conjunction with the accompanying drawings which illustrate a preferred embodiment thereof.

In the drawings:

Figs. 1 and 2 are side and front elevations respectively of a combined tapping and countersinking tool embodying the invention;

Fig. 3 is a longitudinal section taken on line 3—3 of Fig. 1 looking in the direction of the arrows;

Fig. 4 is a view in transverse section taken on the line 4—4 of Fig. 3;

Fig. 5 is an elevation, in section, of the tool attached to the tool carrying portion of a tapping machine spindle, the parts being in normal position with the tap shown at the start of the first thread cut in a pipe fitting but before the countersinking cutter has engaged the front edge of the hole taper and commenced to form the bevel therearound;

Fig. 6 is a similar view of Fig. 5 but showing the position of the tap after cutting a plurality of threads in the pipe fitting and of the countersinking cutter immediately after it has completed the bevel in the front edge of the hole taper but before the tap has advanced to cut the final threads in the fitting;

Fig. 7 is a similar view to Fig. 5 but illustrating the positions of the parts at the completion of tapping the final threads in the fitting, during the cutting of which the countersinking cutter has wiped away stop marks from the surface of the bevel, and illustrating the positions of the parts immediately before reversal of the tool;

Fig. 8 is a perspective view of the improved combination tool according to the present invention;

Fig. 9 is an exploded perspective view of the tap holding adapter or body member of the improved combination tool and the tap therefor;

Fig. 10 is an exploded perspective view of the sleeve member or collar and the countersinking cutter associated therewith;

Fig. 11 is a transverse section of the tap holding adapter and sleeve assembly similar to Fig. 4 but with the tap, the countersinking cutter, and the keys removed; and Fig. 12 is a cross-section of the tap shank taken vertically through the cut-away portion thereof occupied by the half-moon key and looking forwardly of the tap shank.

Referring now more particularly to the drawings, the improved combined tapping and countersinking tool as shown comprises in general a tap holding adapter or body member 10, a sleeve member or collar 12, a tap 13, a countersinking cutter 14, and a spring 15, these parts being shown assembled in Figs. 5 to 7 and in their proper positions when operating on the work.

The tap holding adapter or body member 10 (shown separately in Fig. 9) has a hollow cylindrical head portion 16 and a reduced elongated cylindrical extension or axial stem 17 which is provided with a key 18 and an internally threaded end bore 19 by which it is adapted to be attached to and turned by the reversible tool holder spindle of a power tapping machine. The head 16 has a socket 20 (see Figs. 9 and 11) formed by drilling an axial hole partway into the head from its front end and of a size to receive and support the generally cylindrical shank 22 of the tap 13 (also shown separately in Fig. 9). The tap shank 22 is received in the socket 20 and held in position therein against endwise removal therefrom by an arcuate or half-moon key 24 (see Fig. 9) which is set in a slot 25 in the side of the head 16 extending transversely of its circumference and extending through the wall of the socket and communicating therewith. This slot 25 is cut into the head 16 at right angles to the axis thereof and partway into the upper part of the socket walls and is deep enough so that when the arcuate key 24 is inserted therein the flat bottom face 26 of the key (see Fig. 9) extends into an appropriate transverse flat keyway 27 formed in the tap shank 22. The tap shank is prevented from turning in the socket 20 by a key 28 which forms an interlock between these parts. The key 28 is embedded partway into an axial keyway 29 in the side wall of the socket 20 and is held there by a screw 30 which has screw-threaded connection with the key 28 and passes freely through a suitable hole 31 (see Fig. 11) in the side wall of the head 16 (see Figs. 3, 4 and 11). The key 28 is axially disposed with respect to the head 16 and its unembedded portion extends into an axial keyway 32 in the tap shank 22 (see Figs. 3 and 12) when the latter is inserted in the socket 20 of the adapter head 16. The tap shank 22 also is provided with a second axial keyway 33 (see Figs. 4, 9 and 12) which registers with an axial slot 34 extending the entire length of the socket 20 of the head 16 through its side wall and continuing therebeyond as a deep groove longitudinally and exteriorly of said head into which combined slot and groove is slidably fitted the elongated flat-sided body or blade portion 35 of the countersinking cutter 14 hereafter to be described. The blade portion 35 extends entirely through the wall of the socket 20 forming a projecting key element therein having interlocking engagement with the tap shank by being embedded into the axial keyway 33 thereof to form an interlock between the sleeve 12, the head 16 and the tap shank. As shown in Fig. 12, the two axially extending cutaway portions or keyways 32 and 33 of the tap shank 22 have their longitudinal axes lying in a pair of intersecting planes which are disposed at right angles to each other and have their line of intersection coinciding with the axis of the tap shank. Also, in these same planes are contained the longitudinal axes of the keyway 29 and the slot 34 in the head 16 which register with the keyways 32 and 33 respectively.

The outer sleeve member or collar 12 of this improved tool is generally cylindrical in form (see Fig. 10) and has an axial bore 37 of large diameter extending inwardly from the rear end face of the collar most of the way therethrough into which the cylindrical head 16 of the tap holding adapter slidably fits. Extending inwardly from the front end face of the collar 12 and communicating with the bore 37 is a second axial bore 38 which is of smaller diameter forming an annular shoulder 39 at its juncture with the inner end of the larger bore 37. The diameter of the bore 38 is made such that it will accommodate the largest thread cutting part of the tap received therethrough and also provides sufficient clearance for it to pass axially through the collar 12 as the tap moves forwardly into the fitting F to cut the threads following engagement of the collar with the fitting and resulting rearward sliding movement thereof upon the adapter head 16 during the countersinking operation as will be hereinafter described. Formed in the walls of the bores 37 and 38 is an axial keyway-like groove 40 extending longitudinally throughout the entire length of the collar 12 and there is embedded in this groove the elongated flat-sided outer part of the blade portion 35 of the countersinking cutter which projects radially outwardly from the combined slot and groove 34 in the adapter head 16. The groove 40 communicates at an intermediate portion of its length with an axial slot 41 which extends through the wall of the collar 12 and into which slot is received the outwardly projecting arm portion 44 of the countersinking cutter 14 (see Fig. 8).

The countersinking cutter 14 employed in this tool comprises a small bar made of suitable tool steel and, as shown in Fig. 10, has an elongated flat-sided blade portion 35 of rectangular cross section pointed at one end to provide a sharp cutting edge indicated at 45, and an upstanding arm member 44 integral with the blade. As above-mentioned, the outwardly extending edge portions of the blade 35 of the countersinking cutter on either side of the arm 44 are embedded in the keyway-like groove 40 when the combination tool is completely assembled, in which instance the arm 44 extends upwardly into the slot 41 in the collar 12. As measured along the axis of the collar the slot 41 is made long enough so as to permit appreciable adjustment therein of the arm 44 of the countersinking cutter axially of the collar. In this manner the amount of projection of the cutting edge portion 45 of the countersinking cutter forwardly beyond the front end face of the collar 12 may be adjusted to regulate its cutting action. When properly located in this respect the countersinking cutter 14 has its cutting point terminating in the rearward part of a flute of the threaded portion of the tap 13 and is firmly clamped in place in the collar 12 by axially disposed Allen set-screws 47 and 48 which are located in suitable tapped holes 50 and 51 respectively (see Figs. 5 and 6) in the side wall of the collar and have their inner ends extending well into the slot 41 to bear against opposite sides of the arm 44 of the cutter 14. Tightening of these Allen set-screws 47 and 48 holds the countersinking cutter 14 firmly in the collar.

The collar 12 is arranged to have limited axial sliding movement on the head 16 of the adapter 10, the reason for which movement will be clear when the operation of the tool is described hereafter. To this end, the adapter head 16 is provided with an axial slot 55 into which projects the pin-like tip 56 of a dog point hollow set screw 57 forming a stop for the collar 12. The set screw 57 has threaded engagement in a tapped hole 58 (see Fig. 2) in the side wall of the collar 12 and disposed at right angles to the axis thereof, and is turned down in the hole 58 until the tip end 56 of the screw enters the slot 55 in the head 16. A lock nut 59 threaded on the set screw 57 prevents it from slacking back. The slot 55 does not extend the full length of the adapter head 16, and the forward end of this slot is so positioned with respect to the set screw 57 that the collar 12 is able to slide on the head 16 some distance axially forwardly from its rearwardmost position as depicted in Fig. 7 with the shoulder 39 at the juncture of the bores 37 and 38 bearing against the front face of the adapter, before the set screw 57 engages the forward end of slot 55 (see Fig. 5). Two opposed slots 60 and 61 at diametrically opposite positions near the forward end of the collar 12 and opening into the bore 37 thereof are provided to permit chips from the tapping and countersinking operations to escape from inside the collar when they enter through the bore 38 surrounding the tap.

After the parts thus described are assembled as above indicated and as shown in Figs. 1 through 4, the improved combination tool of this invention is ready for installation on a power tapping machine. It will be understood that such power tapping machine may be of conventional and well known construction so that detailed illustration and description thereof is deemed unnecessary, it being sufficient to state that each such machine is equipped with a hollow tool carrying spindle 65 (see Fig. 5) which is adapted for movement toward and away from the pipe fitting F as by a lead screw (not shown), the pipe fitting being rigidly clamped between suitable work-holding jaws (not shown). There is provided on the spindle 65, when it has been arranged to accommodate this improved combination tool, an annular shoulder 66 located a distance back from the tool-holding end of the spindle and formed by reducing the outer diameter of the spindle to provide the tubular end extension 67 of the spindle, in which there is an axial hole 68. This hole has a keyway 69 cut in the side thereof for the reception of the key 18 embedded in the side of adapter stem 17 for rotating the tool during use and also to prevent the adapter stem from rotating therein. In installing this improved combination tool on the spindle first the spring 15 is placed around the tubular end extension 67 of the tapping machine spindle 15 with one end of the spring abutting against the shoulder 66 of the spindle. Then the stem portion 17 of the adapter 10 is inserted in the spindle hole 68. The draw rod 70 which normally passes through the entire length of the spindle 65 has its threaded end 71 screwed into the internally threaded end bore 19 of the adapter stem 17. In this manner the adapter stem 17 is held firmly in the axial hole 68 and spring 15 which has its other end resting against the back end of collar 12 is in a slightly compressed state. Thus, when the combination tool is in place its spring 15 tends to urge the collar 12 forward on the adapter head 16 until the set screw 56 in the collar engages the forward end of the adapter slot 55 (see Fig. 5). In this position of the collar 12 the countersinking cutter 14 carried thereby is near the forward end of the tap 13 and begins to form the bevel soon after the tap itself enters the work and cuts the first threads, the spring 15 serving to urge the countersinking cutter against the entrance of the hole taper of the fitting (see Fig. 6).

The combined tapping and countersinking operation of the tool takes place as follows: A pipe fitting F to be tapped and countersunk first is clamped between suitable work holding jaws (not shown) which are so located that movement of the spindle 65 by the tapping machine lead screw (not shown) is along the axis of the hole in the fitting to be threaded and countersunk. The tapping machine spindle 65 normally is in its "back" position when the operator clamps the fitting F in place, and the improved combination tool secured in the tubular end extension 67 of the spindle. Power is now applied to rotate the spindle and the combination tool and cause it to move forward toward the fitting. The tapered front end of the tap 13 enters the bore of the fitting F and starts to cut thread (see Fig. 5) and because the sleeve or collar 12 is normally urged forward on the adapter head 16 by the spring 15 the point of the countersinking cutter 14 projecting slightly from the front face of the collar begins to form the chamfer or bevel after a few threads have been cut by the tap. The spring 15 is strong enough so that the cutter 14 completes its beveling cut and the front face of the fitting F engages the front end face of the collar 12 from which the countersinking cutter protrudes before all the threads are cut (see Fig. 7). Because of this condition, the countersinking cutter 14 turns several additional times in the bevel it has cut while the tap 13 cuts the remaining threads in the fitting and thus eliminates any "stop marks" before the tapping machine reverses rotation of the spindle 65 and backs away the tool. "Stop marks" result when a combination tool of this type is backed off before the countersinking cutter has cut to the point where the front face of the pipe fitting engages the front end face of the cutter carrying collar or its equivalent.

The advantages of the improved combination tool as compared with the tools of this kind which have been used in the past are as follows: This improved tool can be completely assembled as a unit in advance of being installed on the end of the tapping machine spindle. Consequently, the preassembled tool can be placed in stock where it is readily available at all times. For many years combination tapping and countersinking tools have been used the design of which is such that they have to be assembled on the tool carrying spindle itself to complete the assembly. Such assembly in the cramped quarters afforded by the machine has always been difficult, particularly when there are small errors in the alignment of the various slots and keys.

By the above-described arrangement and construction of parts and more particularly by the use of cutaway portions and keyways situated as shown, regular production machining operations can be employed to produce the parts which, in the machined portions thereof, will have the accuracy required to obtain their proper alignment and fit in the assembled tool thereby rendering the manufacture of such parts simple and economical, and also capable of being correctly made even when the several different parts which make up the improved combination tool of this invention are obtained from different manufacturing sources.

By having all of the countersinking cutter 14, except the pointed cutting portion thereof which extends forwardly beyond the front face of the collar 12, fully supported as provided by the improved arrangement of this combination tool, the invention has the further advantage that the countersinking cutter is less likely to be broken off on those occasions when there is no pipe fitting clamped in position to be tapped and the operator inadvertently starts up the tapping machine resulting in a collision of the countersinking cutter 14 with the jaws of the clamping fixture.

Although but one form of the invention has been shown and described in detail, it will be understood that other embodiments are possible and that various changes may be made in the design and arrangement of the parts without departing from the spirit of the invention as defined in the claims appended hereto.

What is claimed is:

1. A combined tapping and countersinking tool comprising: a tap having a shank; a body member adapted to be connected with a machine spindle thereby; said body member having a head with an axial bore receiving said tap shank therein; means locking said tap shank to said head for axial and rotary movement therewith; sleeve means on said head having a substantially flat end face located intermediate the ends of the tap thread cutting section and adapted to abut a fitting being tapped; a countersinking cutter fixedly carried by said sleeve means with its cutting edge projecting outwardly of said end face of said sleeve means and also located with its cutting edge intermediate the ends of the tap thread cutting section, said head and tap having slots therein slidably receiving said countersinking cutter so as to hold said sleeve means from rotation relative thereto while permitting relative longitudinal movement; adjustable means in said sleeve means associated with said cutter for fixedly positioning the cutter, and resilient means engaging said sleeve means and normally urging said sleeve means and said cutter toward the free end of said tap, so that said cutter cuts the countersink after the tap initiates its tapping operation and completes the countersink prior to completion of the tapping operation and whereby a part of the torque acting on the cutter when making a countersink is transmitted to the head.

2. The device of claim 1 wherein said adjustable means for fixedly positioning said cutter comprises opposed longitudinally extending screws carried by said sleeve means, the ends of which abut an integral projection on the cutter, whereby adjusting the said opposed screws adjusts the cutter with respect to the sleeve means and the depth of the countersink may thereby be varied.

3. The device of claim 2 wherein the sleeve means carries a radially disposed set screw the end which is slidable in and abuts the opposite ends of a keyway in the said body member, whereby the motion of the sleeve means with respect to the body member is limited.

References Cited in the file of this patent

UNITED STATES PATENTS

| | | |
|---|---|---|
| 626,227 | Gaylor | June 6, 1899 |
| 1,179,860 | Miller | Apr. 18, 1916 |
| 1,501,117 | Johnson | July 15, 1924 |
| 1,539,439 | Smith | May 26, 1925 |
| 1,643,264 | Wetmore | Sept. 20, 1927 |

FOREIGN PATENTS

| | | |
|---|---|---|
| 642,577 | Germany | Mar. 9, 1937 |